United States Patent
Au et al.

(10) Patent No.: US 7,581,384 B2
(45) Date of Patent: Sep. 1, 2009

(54) TURBOMACHINE NOZZLE COVER PROVIDED WITH TRIANGULAR PATTERNS HAVING A POINT OF INFLEXION FOR REDUCING JET NOISE

(75) Inventors: Dax Au, Ivry sur Seine (FR); Pascal Moise Michel Bigot, Moisenay (FR); Pierre Briend, Tours (FR); Pierre Philippe Marie Loheac, Brie Comte-Robert (FR)

(73) Assignee: SNECMA, Paris (FR)

( * ) Notice: Subject to any disclaimer, the term of this patent is extended or adjusted under 35 U.S.C. 154(b) by 265 days.

(21) Appl. No.: 11/759,678

(22) Filed: Jun. 7, 2007

(65) Prior Publication Data
US 2008/0041062 A1 Feb. 21, 2008

(30) Foreign Application Priority Data
Jun. 26, 2006 (FR) .................................. 06 52643

(51) Int. Cl.
F02K 1/46 (2006.01)
(52) U.S. Cl. .............................. 60/262; 60/264; 60/770; 181/220; 239/265.19
(58) Field of Classification Search ................ 60/226.1, 60/262, 264, 770; 181/213, 220; 239/265.17, 239/265.19
See application file for complete search history.

(56) References Cited

U.S. PATENT DOCUMENTS 6,532,729 B2 3/2003 Martens

2002/0164249 A1 11/2002 Strange, Jr. et al.
2003/0213227 A1 11/2003 Balzer
2003/0221411 A1* 12/2003 Nesbitt et al. ................. 60/262
2005/0115245 A1* 6/2005 Prouteau et al. ............... 60/770
2005/0172611 A1* 8/2005 James Blodgett et al. ..... 60/262

FOREIGN PATENT DOCUMENTS

| FR | 2 857 416 A1 | 1/2005 |
| FR | 2 873 166 A1 | 1/2006 |
| WO | WO 00/53915 | 9/2000 |

OTHER PUBLICATIONS

U.S. Appl. No. 11/759,719, filed Jun. 7, 2007, Au et al.

* cited by examiner

Primary Examiner—Ted Kim
(74) Attorney, Agent, or Firm—Oblon, Spivak, McClelland, Maier & Neustadt, P.C.

(57) ABSTRACT

The invention relates to an annular cover for a turbomachine nozzle, the cover having a plurality of patterns extending a trailing edge of said cover and spaced apart circumferentially from one another, each pattern having an outline that is substantially triangular in shape, with a base formed by a portion of the trailing edge of the cover and a vertex spaced downstream from the base and connected thereto by two sides. For each pattern, the vertex presents an outline that is substantially curved; each side is connected to the trailing edge of the cover following an outline that is substantially curved having a radius of curvature that is greater than the radius of curvature of the outline of the vertex; and the outline of each of the sides includes at least one point of inflexion having a tangent that is substantially parallel to the base.

7 Claims, 2 Drawing Sheets

TURBOMACHINE NOZZLE COVER PROVIDED WITH TRIANGULAR PATTERNS HAVING A POINT OF INFLEXION FOR REDUCING JET NOISE

BACKGROUND OF THE INVENTION

The present invention relates to the general field of reducing noise from the jet leaving a turbomachine nozzle. It relates more particularly to a cover for the nozzle of a separate-stream type turbomachine, which cover is provided with patterns for reducing noise from the jet.

Nowadays sound pollution has become a major concern for engine manufacturers who are being challenged more and more concerning the sound nuisance of their turbomachines. The sources of noise in a turbomachine are numerous, but it has been found that the noise from the jet leaving the nozzle is the predominant noise during aircraft takeoff. Since certification authorities are becoming more and more difficult to satisfy in terms of sound emission from turbomachines, engine manufacturers have been required to make efforts to reduce noise from their turbomachines, and in particular noise from the jet leaving the nozzle.

Typically, a separate-stream nozzle of a turbomachine comprises a primary cover coaxial about the longitudinal axis of the turbomachine, a secondary cover disposed coaxially around the primary cover so as to define a first annular channel along which an outer stream (or cool stream) flows, and a central body disposed coaxially inside the primary cover so as to define a second annular channel along which an inner stream (or hot stream) flows, the primary cover extending beyond the secondary cover.

In such a nozzle, the jet noise comes from mixing between the cool and hot streams and between the cool stream and the outside air flowing round the nozzle. This noise is noise over a broad frequency band generated by two types of sound source: high frequency noise coming from small turbulent structures in the mixing between the cool and hot streams and audible essentially in the immediate vicinity of the nozzle; and low frequency noise coming from large turbulent structures that appear at a distance from the jet.

In order to reduce jet noise, one of the means used is to increase the effectiveness of the mixing between the streams. For this purpose, it is well known to provide one of the covers of the nozzle with a plurality of repeated patterns distributed around the circumference of the trailing edge of the cover. By installing such patterns at the trailing edge of the nozzle cover, mixing between the streams is achieved by creating vortices close to the nozzle so as to better dissipate kinetic energy, and consequently reduce the turbulent intensity of large vortices constituting the major sources of noise.

By way of example, U.S. Pat. No. 6,532,729 describes providing the trailing edges of the primary and secondary covers of the nozzle with a plurality of repeated patterns of triangular shape (referred to as "chevrons") that serve to encourage mixing between the hot and cool streams. Similarly, patent publication US 2002/0164249-A1 proposes providing the trailing edges of the primary and secondary covers of the nozzle with a plurality of repeated patterns of trapezoidal shape (referred to as "crenellations").

Although encouraging mixing between the streams, the patterns mentioned above are not entirely satisfactory. Even if such patterns enable the low frequency component of the jet noise to be reduced, that is generally achieved to the detriment of its high frequency component which remains at a level that is too high.

OBJECT AND SUMMARY OF THE INVENTION

A main object of the present invention is thus to mitigate such drawbacks by proposing a geometrical shape for jet noise reduction patterns for a turbomachine nozzle cover that enables both low frequency and high frequency components of jet noise to be reduced.

This object is achieved by an annular cover for a turbomachine nozzle, the cover having a plurality of patterns extending a trailing edge of said cover and spaced apart circumferentially from one another, each pattern having an outline that is substantially triangular in shape, with a base formed by a portion of the trailing edge of the cover and a vertex spaced downstream from the base and connected thereto by two sides, and in which, in accordance with the invention, for each pattern, the vertex presents an outline that is substantially curved, each side is connected to the trailing edge of the cover following an outline that is substantially curved having a radius of curvature that is greater than the radius of curvature of the outline of the vertex, and the outline of each of the sides includes at least one point of inflexion having a tangent that is substantially parallel to the base.

Such a shape for the pattern of substantially triangular shape enables the looked-for results to be obtained, for the following reasons. A pattern that is merely triangular as described in the prior art creates two contrarotating vortices formed on either side of a radial plane of symmetry of the pattern. However, the geometrical characteristics of the pattern of the invention serves to "drag" the vortices towards the vertex of the pattern, i.e. the zone where shear between the streams is the greatest. This results in better mixing between the streams and thus in a reduction of jet noise at low frequencies and at high frequencies.

According to an advantageous disposition, the vertex of at least one of the patterns is inclined radially towards the inside of the cover.

According to another advantageous disposition, each pattern is situated entirely in a single plane.

According to another advantageous disposition, the points of inflexion of each pattern are situated in a zone lying in the range between 40% and 60% of the height of said pattern.

At least one of the patterns may present symmetry about a plane containing the axis of symmetry of the cover and the vertex of said pattern.

The invention also provides a turbomachine nozzle having a primary cover and/or a secondary cover constituted by a cover as defined above.

The invention also provides a turbomachine including at least one cover as defined above.

BRIEF DESCRIPTION OF THE DRAWINGS

Other characteristics and advantages of the present invention appear from the description given below with reference to the accompanying drawings that show an embodiment having no limiting character. In the figures.

DETAILED DESCRIPTION OF AN EMBODIMENT

Figure 1:
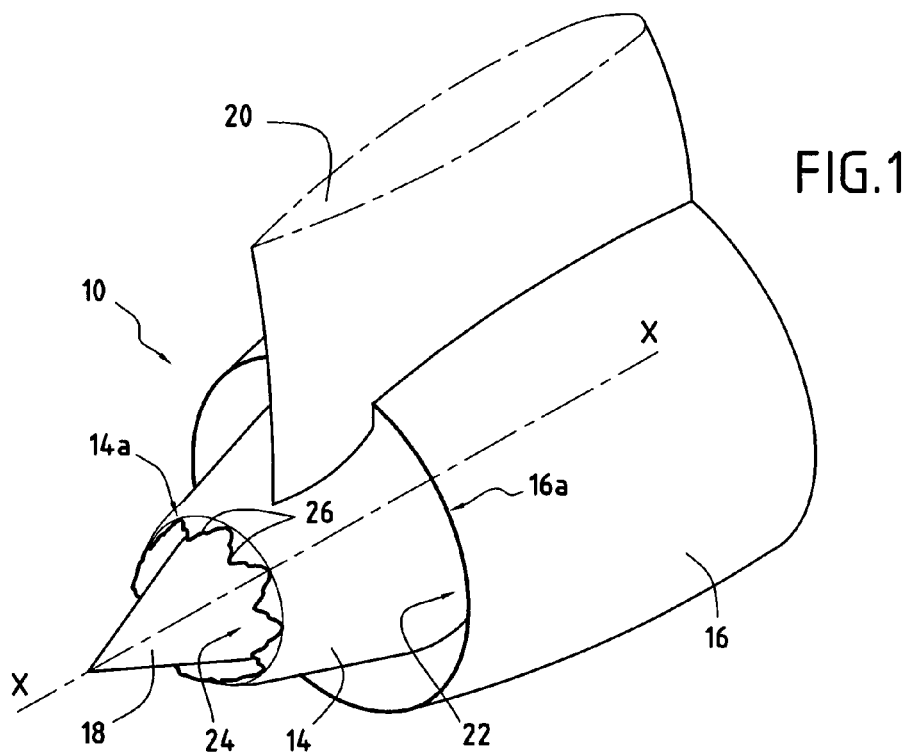
FIG. 1 is a diagrammatic perspective view of a turbomachine nozzle fitted with a cover constituting an embodiment of the invention.

FIG. 1 is a highly diagrammatic perspective view of a separate-stream turbomachine nozzle 10.

The nozzle 10 is circularly symmetrical about its longitudinal axis X-X and is typically constituted by a primary cover 14, a secondary cover 16, and a central body 18, all centered on the longitudinal axis X-X of the nozzle.

The primary cover 14 is substantially cylindrical or tapering in shape, extending along the longitudinal axis X-X of the nozzle. The central body 18 is disposed coaxially inside the primary cover 14 and is terminated by a portion that is substantially conical.

The secondary cover 16 is also substantially cylindrical or tapering in shape, surrounding the primary cover 14 coaxially and also extending along the longitudinal axis X-X of the nozzle. The primary cover 14 extends longitudinally downstream beyond the secondary cover 16.

It should be observed in the embodiment of FIG. 1 that the central body 18 of the nozzle 10 is of the external type, i.e. the central body 18 extends longitudinally beyond the trailing edge 14a of the primary cover 14.

Nevertheless, the invention is also applicable to a separate-stream nozzle of the internal type in which the trailing edge of the primary cover extends longitudinally beyond the central body so as to cover it completely. Similarly, the invention can also apply to a stream-mixing nozzle in which the trailing edge of the secondary cover extends longitudinally beyond that of the primary cover.

The separate-stream nozzle as defined in this way is secured beneath an airplane wing (not shown in the figures) by means of a support pylon 20 that engages the secondary cover 16 of the nozzle and extends inside the secondary cover as far as the primary cover 14.

The coaxial configuration of the elements of the nozzle 10 serves to define firstly between the primary and secondary covers 14 and 16 an annular first channel 22 for allowing air to flow from the turbomachine and referred to as the secondary stream or the cool stream, and secondly between the primary cover 14 and the central body 18, a second annular channel 24 for allowing an internal gas stream to flow that comes from the turbomachine and that is also referred to as the primary stream or the hot stream.

The primary and secondary streams flowing in these two annular channels 22 and 24 mix together at a trailing edge 14a of the primary cover 14. Similarly, the secondary stream mixes with a stream of outside air traveling round the nozzle at a trailing edge 16a of the secondary cover 16.

At least one of the two covers 14 and 16 of the nozzle 10 has a plurality of repeated patterns 26 serving to reduce the noise from the jet leaving the nozzle.

In the embodiment shown in FIG. 1, the jet noise reduction patterns 26 are disposed on the primary cover 14. Nevertheless, they could equally well be disposed solely on the secondary cover 16, or indeed both on the primary cover and on the secondary cover of the nozzle.

The jet noise reduction patterns 26 are disposed to extend the trailing edge 14a of the primary cover 14 and they are regularly spaced apart from one another in the circumference direction.

Figure 2:
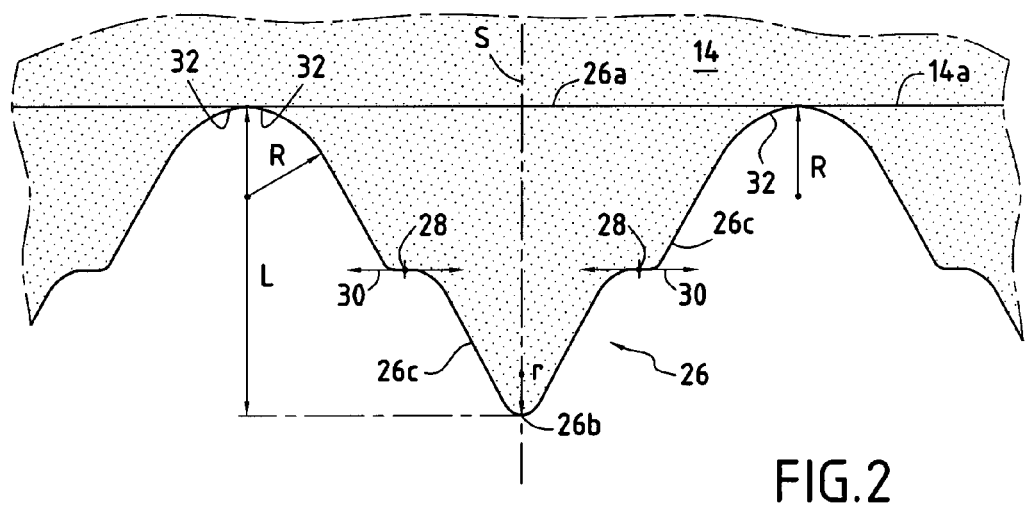
FIG. 2 is a an enlarged view of a jet noise reduction pattern of the FIG. 1 cover.

As shown in greater detail in FIG. 2, each pattern 26 presents an outline that is generally triangular in shape with a base 26a formed by a portion of the trailing edge 14a of the cover 14, and a vertex 26b offset downstream from the base 26a and connected thereto by two sides 26c.

In the invention, each noise reduction pattern 26 presents a certain number of geometrical characteristics, namely: the vertex 26b presents an outline that is substantially curved with a radius of curvature r; each side 26c is connected to the trailing edge 14a of the cover 14 along an outline that is substantially curved having a radius of curvature R that is greater than or equal to the radius of curvature r of the outline at the vertex 26b; the outline of each of the sides 26c includes at least one point of inflexion 28 having a tangent 30 that is substantially parallel to the base 26a.

The term "point of inflexion" is used to mean a regular point on the outline of a side 26c where the outline intersects its own tangent 30.

In the embodiment of FIG. 2, reference 32 designates the curved connection between each side 26c of the pattern 26 and the trailing edge 14a of the cover 14. It should be observed that the profiles of these connections 32 are continuous with those of the connections between the adjacent patterns and the trailing edge of the cover.

Thus, when the connection 32 possesses a radius of curvature R, the vertex 26b of the pattern 26 presents a radius of curvature r that is less than or equal thereto (R≧r). By way of example, the radius of curvature R may be two to five times greater than the radius r.

Still in the embodiment of FIG. 2, it can be seen that each side 26c of the pattern 26 presents a point of inflexion 28 whose tangent 30 is substantially parallel to the base 26a of the pattern. The presence of such a point of inflexion 28 has the consequence of creating a discontinuity in the slope of the outline of each side 26c of the pattern: each side is thus in the form of two curved portions of substantially parabolic profile that are interconnected via the point of inflexion 28.

It is possible for each side of the noise reduction pattern to present a plurality of points of inflexion (e.g. two), each having a tangent substantially parallel to the base of said pattern.

Figure 3:
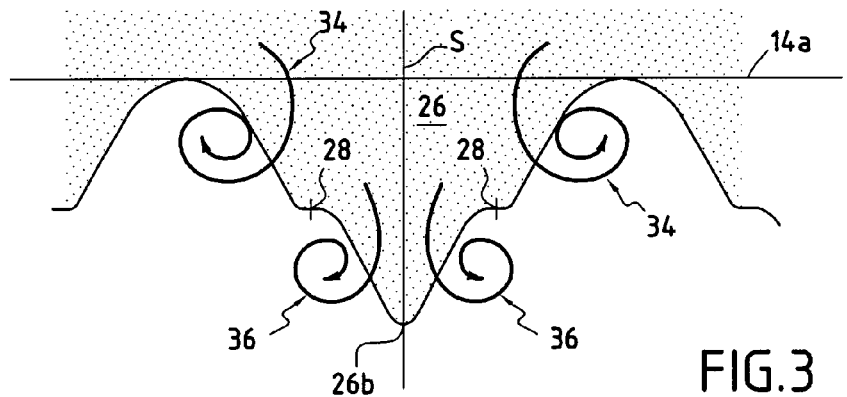
FIG. 3 is a view identical to FIG. 2 showing the turbulence generated by the particular shape of the pattern.

FIG. 3 shows the turbulence generated by the particular shape of such noise reduction patterns 26. In this figure, it can be seen that two contrarotating main vortices 34 are created in the vicinity of the connection zones between the pattern 26 and the trailing edge 14a of the cover, and that two secondary contrarotating vortices 36 appear between the points of inflexion 28 and the vertex 26b of each pattern.

These secondary vortices 36 of smaller intensity than the main vortices 34 indicate that a noise reduction pattern of this shape serves to "drag" the turbulent flow towards the vertex 26b of the pattern, thereby improving mixing between the inner and outer streams in the vicinity of the cover.

According to an advantageous characteristic of the invention, the vertex 26b of at least one of the patterns 26 is inclined radially towards the inside of the cover 14.

Figure 4:
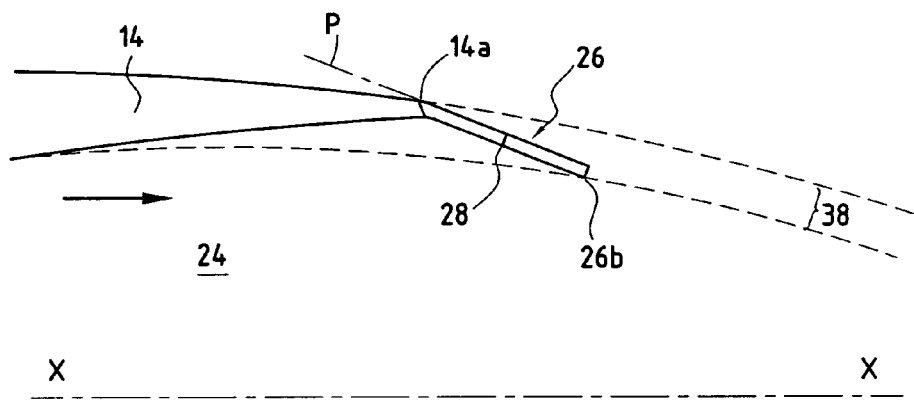
FIG. 4 is a side view of the FIG. 2 pattern.

This characteristic can be seen particularly clearly in FIG. 4 which is a side view of a jet noise reduction pattern 26 disposed extending the trailing edge 14a of the primary cover 14 of the nozzle. In this figure, it can be seen that the vertex 26b of the pattern 26 is indeed radially offset towards the inside of the cover 14 relative to the trailing edge 14a thereof. In other words, the pattern 26 penetrates radially into the annular channel 24 in which the hot stream flows.

Furthermore, it should be observed that the radial inclination of the pattern 26 is preferably limited in such a manner that the pattern is situated inside a boundary layer 38 generated by the flow of the gas stream adjacent to the profile of the cover 14.

According to another advantageous characteristic of the invention, also shown in FIG. 4, the jet noise reduction pattern 26 is situated entirely in a single plane P.

Thus, the base, the vertex 26b, and the points of inflexion 28 of the pattern 26 are preferably situated in the same plane P. In particular, there is preferably no inclination in the radial direction at the points of inflexion 28 relative to the vertex 26 or to the base of the pattern 26.

According to yet another advantageous characteristic of the invention, the points of inflexion 28 of each jet noise reduction pattern 26 are situated in a zone lying in the range 40% to 60% of the height L of said pattern (where the height L as shown in FIG. 2 corresponds to the shortest distance between the base 26a and the vertex 26b of the pattern).

In addition, as shown in FIGS. 2 and 3, each jet noise reduction pattern 26 can be symmetrical about a plane S containing the longitudinal axis of the nozzle and the vertex 26b of said pattern. As a result of such symmetry, the points of inflexion 28 in each of the sides 26c of the pattern 26 are situated at the same height and the sides have the same parabolic profile.

In contrast, it should be observed that there is no symmetry for each side 26c of the pattern 26 relative to a plane containing the tangent 30 of the point of inflexion and extending perpendicularly to the longitudinal axis X-X of the nozzle.

Figure 5:
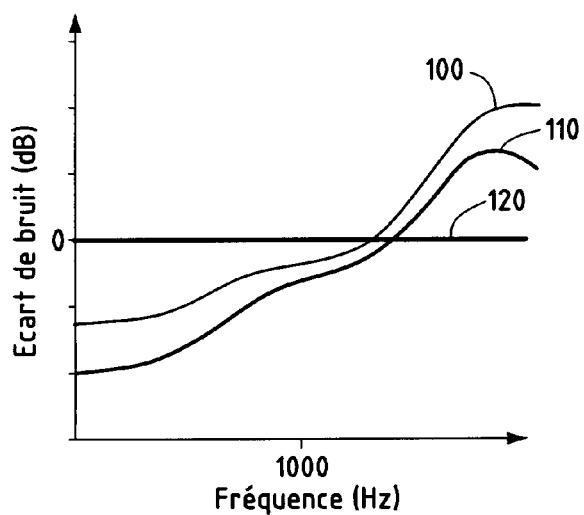
FIG. 5 is a graph showing curves comparing the noise generated by separate-stream nozzles.

Numerical simulations of the noise level generated by a separate-stream nozzle having its primary cover fitted with noise reduction patterns of the invention have been performed. The results of these simulations are shown in the comparative graph of FIG. 5.

The graph in this figure plots curves showing the noise differences in decibels as a function of frequency for a nozzle having its primary cover provided with noise reduction patterns that are merely triangular in shape (curve 100) and a nozzle having its primary cover provided with noise reduction patterns of the invention (curve 110). The noise differences are calculated relative to a curve 120 corresponding to the noise generated by a separate-stream nozzle in which the primary cover does not have any noise reduction patterns.

From the graph, it can be seen that using noise reduction patterns of the invention serves to reduce noise at low frequency (less than about 1000 hertz (Hz)), not only relative to a nozzle that does not have patterns (curve 120), but also relative to a nozzle in which the primary cover is fitted with patterns that are merely triangular (curve 100). The particular shape of the patterns of the invention have another advantage of limiting the extent to which the high frequency component of the noise (greater than about 1000 Hz) is increased compared with conventional triangular patterns.

What is claimed is:

1. An annular cover for a turbomachine nozzle, the cover having a plurality of patterns extending a trailing edge of said cover and spaced apart circumferentially from one another, each pattern having an outline that is substantially triangular in shape, with a base formed by a portion of the trailing edge of the cover and a vertex spaced downstream from the base and connected thereto by two sides, wherein, for each pattern:
   the vertex presents an outline that is substantially curved;
   each side is connected to the trailing edge of the cover following an outline that is substantially curved having a radius of curvature that is greater than the radius of curvature of the outline of the vertex; and
   the outline of each of the sides includes at least one point of inflexion having a tangent that is substantially parallel to the base.

2. A cover according to claim 1, in which the vertex of at least one of the patterns is inclined radially towards the inside of the cover.

3. A cover according to claim 1, in which each pattern is situated entirely in a single plane.

4. A cover according to claim 1, in which the points of inflexion of each pattern are situated in a zone lying in the range 40% to 60% of the height of said pattern.

5. A cover according to claim 1, in which at least one of the patterns presents symmetry about a plane containing the axis of symmetry of the cover and the vertex of said pattern.

6. A turbomachine nozzle including a primary cover disposed about a longitudinal axis of the nozzle and a secondary cover disposed coaxially about the primary cover, wherein the primary cover and/or the secondary cover is/are a cover according to claim 1.

7. A turbomachine including a nozzle having at least one cover according to claim 1.

* * * * *